United States Patent [19]

Ysern de Arce et al.

[11] Patent Number: 4,575,427

[45] Date of Patent: Mar. 11, 1986

[54] PROCEDURE FOR THE TREATMENT OF INDUSTRIAL RESIDUAL SLUDGE

[75] Inventors: Vicente Ysern de Arce; Giovanni Crosti Soldatti, both of Barcelona, Spain

[73] Assignee: Gabinete International Consulting, S.A., Barcelona, Spain

[21] Appl. No.: 590,272

[22] Filed: Mar. 14, 1984

[30] Foreign Application Priority Data

Mar. 15, 1983 [ES] Spain .................................. 520914

[51] Int. Cl.$^4$ ............................................. C02F 1/22
[52] U.S. Cl. .................................. 210/751; 210/766; 210/770; 210/774
[58] Field of Search ............... 210/737, 766, 770, 774, 210/751, 908, 917

[56] References Cited

U.S. PATENT DOCUMENTS

| | | | |
|---|---|---|---|
| 2,703,782 | 3/1955 | Regan et al. | 210/737 X |
| 4,088,577 | 5/1978 | Müller | 210/770 |
| 4,312,759 | 1/1982 | Sherwood et al. | 210/737 X |

*Primary Examiner*—Thomas Wyse
*Attorney, Agent, or Firm*—Cushman, Darby & Cushman

[57] ABSTRACT

A resinous paint sludge residue from commercial spray-gun painting operations is converted into a granulate material useful as an agricultural soil additive by removing the organic solvents and water components, forming the resulting residue into blocks which are then hardened and embrittled then crushed, neutralized as needed and dried. The process is adapted to convert the residue or sludge resulting from a water curtain spraying procedure into a useful granular product.

15 Claims, No Drawings

PROCEDURE FOR THE TREATMENT OF INDUSTRIAL RESIDUAL SLUDGE

BACKGROUND OF THE INVENTION

This invention has the aim of a method for treating industrial residual sludges.

More specifically, and always with the possibility of admitting other similar applications, the invention refers to a method for treating the sludge which comes from the industrial spray-gun painting procedure.

As is well know, in the industrial spray-gun painting of fabricated steel items, and especially in the painting of large-sized parts, such as the bodywork of cars, steel furniture, etc., a water curtain for protection is foreseen at the back wall of the corresponding painting cabin. This curtain catches the flying particles of paint, drives them down, thus preventing them accumulating on the mentioned wall, or, bouncing back to the worker and thus harming him. In this process, thus, a suspension of paint particles in wter is continuously obtained as residue, with the corresponding solvent. This mixture is picked up in decanting trays in which the water is separated, the resulting mass being the so-called paint sludge, which contains an appreciable proportion of thermosetting resins, as well as pigments and mineral fillers.

If it is taken into account that, in general terms, up to fifty percent of the paint applied by spray-gun is caught and driven down by the water curtain, it is easy to imagine the enormous quantity of painting sludge produced in the industry. As is logical, this sludge must be removed. For this, the most generally used method consists of discharging it into large waterproofed concrete tanks or containers so as to prevent the filtration of the liquid components, which are later transported to determined removal points. As is logical, this elimination is relatively expensive; at present it is calculated at nine pesetas per kilogram, which obviously represents a direct expense for the industry; and moreover it brings about social costs which, although they are difficult to quantify, turn out less serious and real, given that the use of the container waste areas is forever affected, both for agriculture and for construction.

This invention aims precisely at a method which allows the recuperation of the solid part of the mentioned sludge, with view to a future practical use, by eliminating the liquid components—water and solvents—present in the sludge. In this way, the social problems and costs which are typical of the classical sludge elimination system mentioned above are solved completely, and the purely economic costs of this elimination are reduced appreciably: they are compensated to a large extent or even completely by the value of the solid components which are recuperated and used for later applications.

DETAILED DESCRIPTION OF THE INVENTION

In accordance with the invention, a method for treating the sludge coming from the industrial spray-gun painting process is proposed. That is, a method for treating the sludge which includes, in a pasty agglomerate state, a mixture of resinoid elements, pigments, mineral fillers, water and solvents, which consists basically of six main phases. In accordance with the said method, in the first phase, the water and solvents left over from the plastic agglomerate are eliminated; in the second phase, the plastic agglomerate is divided into blocks of predetermined dimensions; the third phase is dedicated to embrittling the obtained blocks; in the fourth phase, the mentioned blocks are broken into granules of predetermined dimensions, their brittleness being maintained; in the fifth phase, the acidity or basicity of the obtained product is neutralized; and finally, the sixth phase consists of eliminating the remaining residual humidity in the obtained product completing the polymerization process of the paint which was interrupted in the phase where the cloud of paint is thrown towards the water curtain which protects the back wall of the corresponding cabin.

Analyzing this in more detail for a better understanding of the method behind this invention, each one of the indicated phases has:

The method at which this invention is aimed shall be applied to the treatment of the sludge from the industrial spray-gun painting process which is between twenty and forty percent resinoid thermoplastic bonding solids, between fifteen and forty percent pigments and mineral fillers, and between thirty-five and fifty percent water and solvents.

In accordance with the method in question, in the first phase, and whenever necessary, the liquid content of the sludge to be treated is reduced until this content is less than twenty percent. This elimination of liquids can be carried out by means of any known method, although it is preferable to realize it by suction, using a suitable device and a suction pump.

The liquid compenent content of the sludge after the first phase will vary in accordance with the origin of the same, varying approximately between ten percent of the total weight, when coming from an undercoat, and sixteen percent when coming from a final enamel paint.

It must be pointed out that this first phase in carrying out the method is not essential for putting the same into practice, for in many cases it can be done without providing, of course, that the liquid content of the sludge to be treated does not reach the upper limit indicated above. Moreover, experience has shown that, starting from any sludge of the type referred to, it is possible to continue with the following phases and objectives of the method, even though the first operation of the suction of the water-solvent liquid component is omitted.

In the second phase of the method, the sludge is taken to a conveyor belt on which, by means of suitable mechanical devices, it is divided into a succession of blocks of predetermined dimensions. During this phase there is also an explusion of water-solvent liquid, which is separated from the sludge as a result of the pressure from the belt during the conveying process, and collected by a suitable device.

In the following phase of the method, the blocks of sludge which have been prepared in the way explained above are frozen by means of a freezer or any other method, for example, by means of cryogenic liquid. This operation is prolonged for the time necessary for taking the actual sludge to a temperature between 50 and 100° C. below zero. This operation is aimed at giving the sludge which has been treated in the way indicated, the degree of brittleness which will allow it to be broken into small pieces. Experiments carried out have shown that, after a temperature of 30° C. below zero, the sludge is in a suitable state for being broken up in accordance with the requirements of the procedure.

In the succeeding stage, the blocks of sludge which have been treated as described are submitted to a crushing operation in which, for example, a roller crusher is used. During the course of this crushing operation, the roller gap opening must be duly calculated so as to obtain a crushing which results in a crushed product having the required dimensions.

In the following phase of the practical realization of the method, and relation to the degree of residual acidity or alkalinity present in the crushed sludge, the material is submerged, using, for example, suitable trays, in tanks which contain alkaline or acid solutions respectively, so as to compute the neutralization.

Finally, in the last stage and in accordance with the process of this invention, the duly treated sludge is put into a drying oven, of any appropriate type, capable of reaching temperatures between 120° and 220° C., for enough time so as to guarantee the total drying of the crushed sludge and the complete polymerization of the resin contained in the sludge itself. This thermal treatment shall never be prolonged for more than two hours, even if the mass of sludge to be dried is very solid.

The crushed sludge, duly neutralized, dried and with the completely polymerized resin, which is obtained as a final result of the treatment, is capable of numerous practical applications, being a granulate, whose particles take on irregular and spongy shapes, their dimensions being exactly the adequate ones for the specific application in each case, and characterized by the fact that they are waterproof. Thus, for example, in a specially recommended application, the mentioned granulate, duly spread over farm land, in the correct quantity, will improve the preservation and conditions of the land, favouring the absorption of rain water or irrigation water, and limiting the losses of water due to evaporation by virtue of the waterproofed nature of the granulate.

In short, thus, the method of this invention, with relatively modest overall costs, allows the solid components of industrial sludge to be converted into an exploitable material, while the water-solvent liquid compenents are eliminated by evaporation. In this way the inconveniences and social costs of dumping the mentioned sludge in the outside environment are completely overcome and the financial costs of this elimination are reduced appreciably, for they are compensated to a large extent, or even completely, by the market value of the recuperated material.

Finally, it is understood that in the different phases and operations making up the method, numerous additions and modifications with regard to detail can be introduced, while practicing the process within the spirit of the invention.

We claim:

1. A process for treating resinous paint sludge residue resulting from a spray-gun painting process to produce a waterproof granulate whose particles have irregular, spongy shapes, said process comprising the successive steps of:
   (1) collecting from a spray-gun painting process a paint sludge containing resinous paint residue as a solid component together with organic solvents and water as the liquid component, and removing at least a portion of the liquid component to produce a resinous paint residue agglomerate;
   (2) dividing the resinous paint residue agglomerate into blocks of predetermined dimensions;
   (3) freezing the blocks produced in step (2) to a temperature below 0° C. thereby hardening and embrittling the residue;
   (4) crushing the hardened and embrittled blocks of step (3) to produce residue particles of a predetermined size;
   (5) measuring the acidity or alkalinity of the residue particles and treating the particles as required to neutralize same; and
   (6) completely drying the neutralized residue particles to complete polymerization of the paint resin thereby producing a waterproof granulate whose particles have irregular, spongy shapes.

2. The process of claim 1 in which the resinous paint sludge residue including liquid components to be treated contains:
   resinous thermoplastic paint solids: 20–40%,
   pigments and mineral fillers: 15–40%,
   water and organic solvents: 35–50%.

3. The process of claim 1 in which the liquid component in step (1) is reduced to less than 20%.

4. The process of claim 3 in which the liquid component in step (1) is removed by suction.

5. The process of claim 1 in which the paint residue agglomerate is divided into blocks of predetermined dimensions in step (2) as the paint residue agglomerate passes along on a conveyor belt.

6. The process of claim 5 in which an additional quantity of organic solvent and water liquid component is removed from the paint residue agglomerate as it passes along the conveyor belt.

7. The process of claim 1 in which the freezing is at a temperature in the range of about −50° C. to −100° C.

8. The process of claim 1 in which the freezing is at a temperature below 0° C. to about −30° C.

9. The process of claim 7 in which the blocks are exposed to a cyrogenic liquid.

10. The process of claim 1 in which the blocks are crushed into particles of a predetermined maximum size in a roller crusher.

11. The process of claim 1 in which the residue particles in step (5) are acidic and are immersed in an alkaline solution to neutralize same.

12. The process of claim 1 in which the residue particles in step (5) are alkaline and are immersed in an acid solution to neutralize same.

13. The process of claim 1 in which the drying step (6) is conducted in a drying oven at a temperature of between about 120° C. and about 200° C.

14. The process of claim 13 in which the neutralized residue particles are dried in drying step (6) for a period of not more than 2 hours.

15. The process of claim 1 in which the waterproof granulate particles so produced are of a size suitable for the direct application to soil as an agricultural improver.

* * * * *